(12) United States Patent
Franks et al.

(10) Patent No.: US 9,726,043 B2
(45) Date of Patent: *Aug. 8, 2017

(54) MOUNTING APPARATUS FOR LOW-DUCTILITY TURBINE SHROUD

(75) Inventors: Michael John Franks, Cincinnati, OH (US); Jason David Shapiro, Lynn, MA (US); Samuel Ross Rulli, Gloucester, MA (US); Roger Lee Doughty, Pleasant Plain, OH (US)

(73) Assignee: General Electric Company, Schenectady, NY (US)

( * ) Notice: Subject to any disclaimer, the term of this patent is extended or adjusted under 35 U.S.C. 154(b) by 774 days.

This patent is subject to a terminal disclaimer.

(21) Appl. No.: 13/327,349

(22) Filed: Dec. 15, 2011

(65) Prior Publication Data

US 2013/0156550 A1    Jun. 20, 2013

(51) Int. Cl.
| | |
|---|---|
| *F01D 11/08* | (2006.01) |
| *F01D 25/24* | (2006.01) |
| *F01D 11/12* | (2006.01) |
| *F01D 11/24* | (2006.01) |
| *F01D 5/28* | (2006.01) |

(52) U.S. Cl.
CPC ............ *F01D 25/246* (2013.01); *F01D 11/08* (2013.01); *F01D 11/12* (2013.01); *F01D 5/284* (2013.01); *F01D 11/24* (2013.01); *F05D 2240/11* (2013.01); *F05D 2250/41* (2013.01); *F05D 2260/38* (2013.01); *Y02T 50/672* (2013.01)

(58) Field of Classification Search
CPC ........ F01D 25/246; F01D 11/00; F01D 11/08; F01D 11/12; F01D 11/122; F01D 11/14; F01D 11/16; F01D 11/18

USPC ....................................................... 415/173.1
See application file for complete search history.

(56) References Cited

U.S. PATENT DOCUMENTS

| | | | | |
|---|---|---|---|---|
| 3,583,824 | A * | 6/1971 | Smuland et al. | ............. 415/117 |
| 3,778,185 | A | 12/1973 | Plowman et al. | |
| 4,087,199 | A * | 5/1978 | Hemsworth et al. | ...... 415/173.3 |
| 4,460,311 | A | 7/1984 | Trappmann et al. | |
| 4,596,116 | A | 6/1986 | Mandet et al. | |

(Continued)

FOREIGN PATENT DOCUMENTS

| | | |
|---|---|---|
| CA | 2520792 A1 | 3/2006 |
| CA | 2740538 A1 * | 11/2011 |

(Continued)

OTHER PUBLICATIONS

Marusko, et al.; U.S. Appl. No. 12/790,209, filed May 28, 2010.

(Continued)

*Primary Examiner* — Richard Edgar
(74) *Attorney, Agent, or Firm* — General Electric Company; Brian P. Overbeck (57) ABSTRACT

A shroud apparatus for a gas turbine engine includes: an annular metallic hanger; a shroud segment disposed inboard of the hanger, comprising low-ductility material and having a cross-sectional shape defined by opposed forward and aft walls, and opposed inner and outer walls, the walls extending between opposed first and second end faces, wherein the inner wall defines an arcuate inner flowpath surface; and a retainer mechanically coupled to the hanger which engages the shroud segment to retain the shroud segment to the hanger while permitting movement of the shroud segment in a radial direction.

15 Claims, 4 Drawing Sheets

(56) References Cited

U.S. PATENT DOCUMENTS

| | | |
|---|---|---|
| 4,759,687 A | 7/1988 | Miraucourt et al. |
| 4,863,345 A | 9/1989 | Thompson et al. |
| 5,048,288 A | 9/1991 | Bessette et al. |
| 5,074,748 A | 12/1991 | Hagle |
| 5,080,557 A | 1/1992 | Berger |
| 5,127,793 A | 7/1992 | Walker et al. |
| 5,137,421 A | 8/1992 | Hayton |
| 5,154,577 A | 10/1992 | Kellock et al. |
| 5,169,287 A | 12/1992 | Proctor et al. |
| 5,188,507 A | 2/1993 | Sweeney |
| 5,197,853 A | 3/1993 | Creevy et al. |
| 5,593,277 A | 1/1997 | Proctor et al. |
| 5,655,876 A | 8/1997 | Rock et al. |
| 5,738,490 A | 4/1998 | Pizzi |
| 5,780,146 A | 7/1998 | Mason et al. |
| 5,964,575 A | 10/1999 | Marey |
| 6,113,349 A | 9/2000 | Bagepalli et al. |
| 6,164,656 A | 12/2000 | Frost |
| 6,290,459 B1 | 9/2001 | Correia |
| 6,315,519 B1 | 11/2001 | Bagepalli et al. |
| 6,340,285 B1 | 1/2002 | Gonyou et al. |
| 6,402,466 B1 | 6/2002 | Burdgick et al. |
| 6,412,149 B1 | 7/2002 | Overberg |
| 6,413,042 B2 | 7/2002 | Correia |
| 6,503,051 B2 | 1/2003 | Predmore |
| 6,503,574 B1 | 1/2003 | Skelly et al. |
| 6,699,011 B2 | 3/2004 | Cot et al. |
| 6,702,550 B2 * | 3/2004 | Darkins et al. ............... 415/139 |
| 6,733,235 B2 | 5/2004 | Alford et al. |
| 6,808,363 B2 | 10/2004 | Darkins, Jr. et al. |
| 6,884,026 B2 | 4/2005 | Glynn et al. |
| 6,887,528 B2 | 5/2005 | Lau et al. |
| 6,893,214 B2 | 5/2005 | Alford et al. |
| 6,942,203 B2 | 9/2005 | Schroder et al. |
| 7,011,493 B2 | 3/2006 | Marchi et al. |
| 7,052,235 B2 | 5/2006 | Alford et al. |
| 7,217,089 B2 | 5/2007 | Durocher et al. |
| 7,238,002 B2 | 7/2007 | Cairo et al. |
| 7,270,518 B2 | 9/2007 | Barb et al. |
| 7,278,820 B2 * | 10/2007 | Keller ........................ 415/173.1 |
| 7,556,475 B2 | 7/2009 | Roberts, III et al. |
| 7,563,071 B2 * | 7/2009 | Campbell et al. ......... 415/173.1 |
| 7,595,114 B2 | 9/2009 | Meschter et al. |
| 7,686,577 B2 | 3/2010 | Morrison et al. |
| 7,726,936 B2 | 6/2010 | Keller et al. |
| 7,749,565 B2 | 7/2010 | Johnson et al. |
| 7,753,643 B2 | 7/2010 | Gonzalez et al. |
| 7,819,625 B2 | 10/2010 | Merrill et al. |
| 7,871,244 B2 | 1/2011 | Marini et al. |
| 7,908,867 B2 | 3/2011 | Keller et al. |
| 7,910,172 B2 | 3/2011 | Meschter et al. |
| 7,950,234 B2 | 5/2011 | Radonovich et al. |
| 7,968,217 B2 | 6/2011 | Sarrafi-Nour et al. |
| 8,047,773 B2 | 11/2011 | Bruce et al. |
| 8,079,807 B2 | 12/2011 | Shapiro et al. |
| 8,118,546 B2 | 2/2012 | Morrison |
| 8,128,350 B2 | 3/2012 | Schiavo et al. |
| 8,167,546 B2 | 5/2012 | Shi et al. |
| 8,303,247 B2 | 11/2012 | Schlichting et al. |
| 8,328,505 B2 | 12/2012 | Shi et al. |
| 8,834,106 B2 | 9/2014 | Luczak |
| 2002/0127108 A1 | 9/2002 | Crall et al. |
| 2003/0031557 A1 | 2/2003 | Arilla et al. |
| 2003/0202876 A1 * | 10/2003 | Jasklowski et al. .......... 415/135 |
| 2003/0215328 A1 | 11/2003 | McGrath et al. |
| 2004/0005216 A1 | 1/2004 | Suzumura et al. |
| 2004/0005452 A1 | 1/2004 | Dorfman et al. |
| 2004/0047726 A1 | 3/2004 | Morrison |
| 2004/0062640 A1 * | 4/2004 | Darkins et al. ............... 415/134 |
| 2004/0219011 A1 | 11/2004 | Albers et al. |
| 2005/0003172 A1 | 1/2005 | Wheeler et al. |
| 2005/0111965 A1 | 5/2005 | Lowe et al. |
| 2005/0129499 A1 * | 6/2005 | Morris et al. .................... 415/1 |
| 2005/0141989 A1 | 6/2005 | Sayegh et al. |
| 2006/0078429 A1 | 4/2006 | Darkins, Jr. et al. |
| 2006/0083607 A1 | 4/2006 | Synnott et al. |
| 2006/0110247 A1 | 5/2006 | Nelson et al. |
| 2006/0110248 A1 | 5/2006 | Nelson et al. |
| 2006/0292001 A1 | 12/2006 | Keller et al. |
| 2007/0031245 A1 | 2/2007 | Ruthemeyer et al. |
| 2007/0154307 A1 | 7/2007 | Cairo |
| 2008/0025838 A1 | 1/2008 | Marini et al. |
| 2008/0206046 A1 * | 8/2008 | Razzell et al. .............. 415/173.1 |
| 2008/0206542 A1 | 8/2008 | Vance et al. |
| 2009/0010755 A1 | 1/2009 | Keller et al. |
| 2009/0053045 A1 | 2/2009 | Nowak et al. |
| 2009/0208322 A1 | 8/2009 | McCaffrey |
| 2009/0324393 A1 | 12/2009 | Gonzalez et al. |
| 2011/0085899 A1 | 4/2011 | Foster et al. |
| 2011/0182720 A1 * | 7/2011 | Kojima et al. .............. 415/173.4 |
| 2011/0274538 A1 | 11/2011 | Shi et al. |
| 2011/0299976 A1 | 12/2011 | Uskert |
| 2011/0318171 A1 | 12/2011 | Albers et al. |
| 2012/0156029 A1 | 6/2012 | Karafillis et al. |
| 2012/0247124 A1 | 10/2012 | Shapiro et al. |
| 2012/0260670 A1 | 10/2012 | Foster et al. |
| 2012/0263582 A1 | 10/2012 | Foster et al. |
| 2012/0275898 A1 | 11/2012 | McCaffrey et al. |
| 2013/0000324 A1 | 1/2013 | Alvanos et al. |
| 2013/0008176 A1 | 1/2013 | Shi et al. |
| 2013/0011248 A1 | 1/2013 | Croteau et al. |
| 2013/0017057 A1 * | 1/2013 | Lagueux ........................... 415/1 |
| 2013/0266435 A1 | 10/2013 | Foster et al. |
| 2014/0255170 A1 | 9/2014 | Hillier |
| 2014/0271144 A1 | 9/2014 | Landwehr et al. |
| 2014/0271145 A1 | 9/2014 | Thomas et al. |
| 2014/0294571 A1 | 10/2014 | Hillier |
| 2014/0294572 A1 | 10/2014 | Hillier et al. |
| 2014/0308113 A1 | 10/2014 | Westphal et al. |
| 2015/0016970 A1 | 1/2015 | Smith et al. |

FOREIGN PATENT DOCUMENTS

| | | |
|---|---|---|
| CN | 1219215 A | 6/1999 |
| CN | 1458393 A | 11/2003 |
| CN | 1542259 A | 11/2004 |
| CN | 101372902 A | 2/2009 |
| EP | 0770761 A1 | 5/1997 |
| EP | 1225309 A1 | 7/2002 |
| EP | 1548144 A1 | 6/2005 |
| EP | 1801361 A1 | 6/2007 |
| EP | 1965030 | 9/2008 |
| EP | 2631434 A2 | 8/2013 |
| EP | 2774905 A1 | 9/2014 |
| FR | 2540938 A1 | 8/1984 |
| FR | 2580033 A1 | 10/1986 |
| FR | 2942844 A1 | 9/2010 |
| GB | 2397102 A | 7/2004 |
| JP | 57010710 | 1/1982 |
| JP | 63239301 A | 10/1988 |
| JP | 04330302 A | 11/1992 |
| JP | 05141270 A | 6/1993 |
| JP | 09013904 A | 1/1997 |
| JP | 10103014 A | 4/1998 |
| JP | 2002276301 A | 9/2002 |
| JP | 2004036443 A | 2/2004 |
| JP | 2005155626 A | 6/2005 |
| JP | 2006105393 A | 4/2006 |
| JP | 2007046603 A | 2/2007 |
| JP | 2007182881 A1 | 7/2007 |
| JP | 2011080468 A | 4/2011 |
| JP | 2013170578 A | 9/2013 |
| WO | 02099254 A1 | 12/2002 |
| WO | 03026886 A2 | 4/2003 |
| WO | 2013163505 A1 | 10/2013 |
| WO | 2014130762 A1 | 8/2014 |

OTHER PUBLICATIONS

Dziech et al.; U.S. Appl. No. 12/895,007, filed Sep. 30, 2010.
Albers et al.; U.S. Appl. No. 12/915,424, filed Oct. 29, 2010.
Albers et al.; U.S. Appl. No. 12/982,082, filed Dec. 30, 2010.
Albers et al.; U.S. Appl. No. 12/982,105, filed Dec. 30, 2010.

(56) References Cited

OTHER PUBLICATIONS

Albers et al.; U.S. Appl. No. 13/173,897, filed Jun. 30, 2011.
Unofficial English translation of Chinese Office Action issued in connection with corresponding CN Application No. 201210541477.1 on May 12, 2015.
Unofficial English Translation of Chinese Office Action issued in connection with corresponding CN Application No. 201310056712.0 on Jun. 19, 2015.
A European Search Report and Opinion issued in connection with corresponding EP Application No. 12195953 on Jul. 22, 2015.
Curtis Alan Johnson, filed Sep. 29, 2006, U.S. Appl. No. 11/537,278.
Non-Final Office Action issued in connection with related U.S. Appl. No. 11/537,278 dated Jul. 9, 2009.
Final Office Action issued in connection with related U.S. Appl. No. 11/537,278 dated Jan. 27, 2010.
PCT Search Report and Written Opinion issued in connection with corresponding PCT Application No. PCT/US2014/068490 dated Mar. 5, 2015.
Unofficial English Translation of Japanese Office Action issued in connection with corresponding JP Application No. 2012269895 dated Oct. 4, 2016.
Unofficial English Translation of Japanese Office Action issued in connection with corresponding JP Application No. 2013027200 dated Oct. 18, 2016.
Unofficial English Translation of Chines Office Action issued in connection with corresponding CN Application No. 201480067368.8 dated Nov. 2, 2016.
Unofficial English Translation of Japanese Notice of Allowance issued in connection with corresponding JP Application No. 2013027200 dated Nov. 29, 2016.
PCT Search Report and Written Opinion issued in connection with related PCT Application No. PCT/US2014/035089 dated Jul. 1, 2014.
Chinese Office Action issued in connection with related CN Application No. 201480028735.3 dated Sep. 5, 2016.
Japanese Office Action issued in connection with related JP Application No. 2016513961 dated Nov. 8, 2016.
Curtis Alan Johnson et al., filed Sep. 29, 2006, U.S. Appl. No. 11/537,278.
Michael John Franks et al., filed Feb. 22, 2012, U.S. Appl. No. 13/402,616.
Jonathan David Baldiga et al., filed Nov. 17, 2015, U.S. Appl. No. 14/891,806.
Jason David Shapiro et al., filed Jun. 7, 2016, U.S. Appl. No. 15/102,370.
PCT Search Report and Written Opinion issued in connection with related PCT Application No. PCT/US2015/029236 dated Jul. 20, 2015.
PCT Search Report and Written Opinion issued in connection with related PCT Application No. PCT/US2015/029342 dated Jul. 22, 2015.
PCT Search Report and Written Opinion issued in connection with related PCT Application No. PCT/US2015/028050 dated Aug. 11, 2015.
European Search Report and opinion issued in connection with related EP Application No. 16155655.0 dated Aug. 1, 2016.
Chinese Office Action issued in connection with related CN Application No. 201610106090.1 dated Jan. 4, 2017.
Canadian Office Action issued in connection with related CA Application No. 2921269 dated Jan. 25, 2017.
Japanese Search Report issued in connection with related JP Application No. 2016029448 dated Jan. 25, 2017.
Japanese Office Action issued in connection with related JP Application No. 2016029448 dated Feb. 7, 2017.
Japanese Notice of Allowance issued in connection with related JP Application No. 2016513961 dated Feb. 21, 2017.

* cited by examiner

MOUNTING APPARATUS FOR LOW-DUCTILITY TURBINE SHROUD

BACKGROUND OF THE INVENTION

This invention relates generally to gas turbine engines, and more particularly to apparatus and methods for mounting shrouds made of a low-ductility material in the turbine sections of such engines.

A typical gas turbine engine includes a turbomachinery core having a high pressure compressor, a combustor, and a high pressure turbine in serial flow relationship. The core is operable in a known manner to generate a primary gas flow. The high pressure turbine (also referred to as a gas generator turbine) includes one or more rotors which extract energy from the primary gas flow. Each rotor comprises an annular array of blades or buckets carried by a rotating disk. The flowpath through the rotor is defined in part by a shroud, which is a stationary structure which circumscribes the tips of the blades or buckets. These components operate in an extremely high temperature environment, and must be cooled by air flow to ensure adequate service life. Typically, the air used for cooling is extracted (bled) from the compressor. Bleed air usage negatively impacts specific fuel consumption ("SFC") and should generally be minimized.

It has been proposed to replace metallic shroud structures with materials having better high-temperature capabilities, such as ceramic matrix composites (CMCs). These materials have unique mechanical properties that must be considered during design and application of an article such as a shroud segment. For example, CMC materials have relatively low tensile ductility or low strain to failure when compared with metallic materials. Also, CMCs have a coefficient of thermal expansion ("CTE") in the range of about 1.5-5 microinch/inch/degree F., significantly different from commercial metal alloys used as supports for metallic shrouds. Such metal alloys typically have a CTE in the range of about 7-10 microinch/inch/degree F.

CMC shrouds must be positively positioned within the engine in order to effectively perform. Some CMC shrouds have been designed with the shroud component attached to an engine case using a metallic clamping element. While effective for mounting and positioning, these designs can require multiple closely spaced bolts. High bending stress can occur in the bolts, which is contrary to best engineering practice for bolt use.

Other CMC shroud mounting designs avoid the use of a bolted clamp, but transmit high loads from surrounding metallic hardware through the box cross-section of the CMC shroud itself. This reduces the reliability of the shroud segment.

Accordingly, there is a need for an apparatus for mounting CMC and other low-ductility turbine structures that minimizes mechanical loads on the shroud.

BRIEF DESCRIPTION OF THE INVENTION

This need is addressed by the present invention, which provides a shroud segment which is positioned and retained to a surrounding structure by a retainer which permits a radial clearance between the shroud and the hanger.

According to one aspect of the invention, a shroud apparatus for a gas turbine engine includes: an annular metallic hanger; a shroud segment disposed inboard of the hanger, comprising low-ductility material and having a cross-sectional shape defined by opposed forward and aft walls, and opposed inner and outer walls, the walls extending between opposed first and second end faces, wherein the inner wall defines an arcuate inner flowpath surface; and a retainer mechanically coupled to the hanger which engages the shroud segment to retain the shroud segment to the hanger while permitting movement of the shroud segment in a radial direction.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
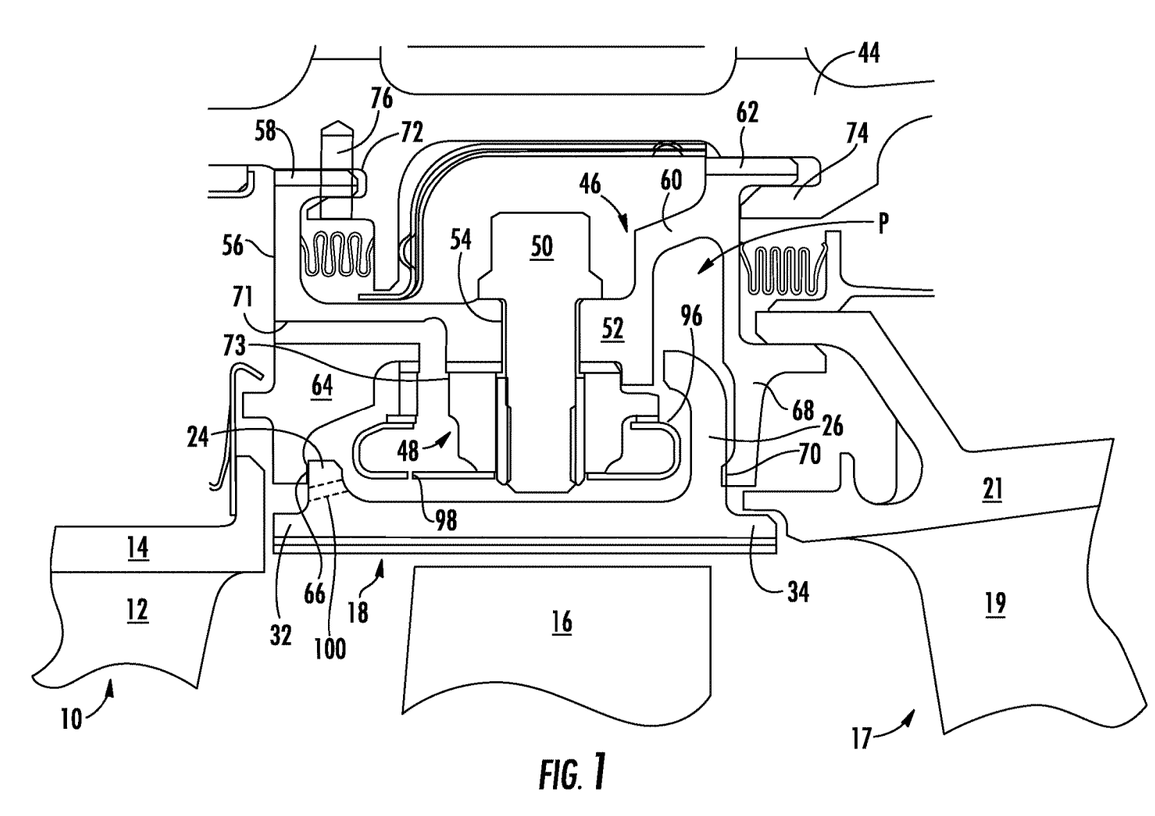
FIG. 1 is a schematic cross-sectional view of a portion of a turbine section of a gas turbine engine, incorporating a shroud mounting apparatus constructed in accordance with an aspect of the present invention.

Referring to the drawings wherein identical reference numerals denote the same elements throughout the various views, FIG. 1 depicts a small portion of a turbine, which is part of a gas turbine engine of a known type. The function of the turbine is to extract energy from high-temperature, pressurized combustion gases from an upstream combustor (not shown) and to convert the energy to mechanical work, in a known manner. The turbine drives an upstream compressor (not shown) through a shaft so as to supply pressurized air to the combustor.

The principles described herein are equally applicable to turbofan, turbojet and turboshaft engines, as well as turbine engines used for other vehicles or in stationary applications. Furthermore, while a turbine shroud is used as an example, the principles of the present invention are applicable to any low-ductility flowpath component which is at least partially exposed to a primary combustion gas flowpath of a gas turbine engine.

The turbine includes a stationary nozzle 10. It may be of unitary or built-up construction and includes a plurality of airfoil-shaped stationary turbine vanes 12 circumscribed by an annular outer band 14. The outer band 14 defines the outer radial boundary of the gas flow through the turbine nozzle 10. It may be a continuous annular element or it may be segmented.

Downstream of the nozzle 10, there is a rotor disk (not shown) that rotates about a centerline axis of the engine and carries an array of airfoil-shaped turbine blades 16. A shroud comprising a plurality of arcuate shroud segments 18 is arranged so as to encircle and closely surround the turbine blades 16 and thereby define the outer radial flowpath boundary for the hot gas stream flowing through the turbine blades 16.

Downstream of the turbine blades 16, there is a downstream stationary nozzle 17. It may be of unitary or built-up construction and includes a plurality of airfoil-shaped stationary turbine vanes 19 circumscribed by an annular outer band 21. The outer band 21 defines the outer radial boundary of the gas flow through the turbine nozzle 17. It may be a continuous annular element or it may be segmented.

Figure 2:
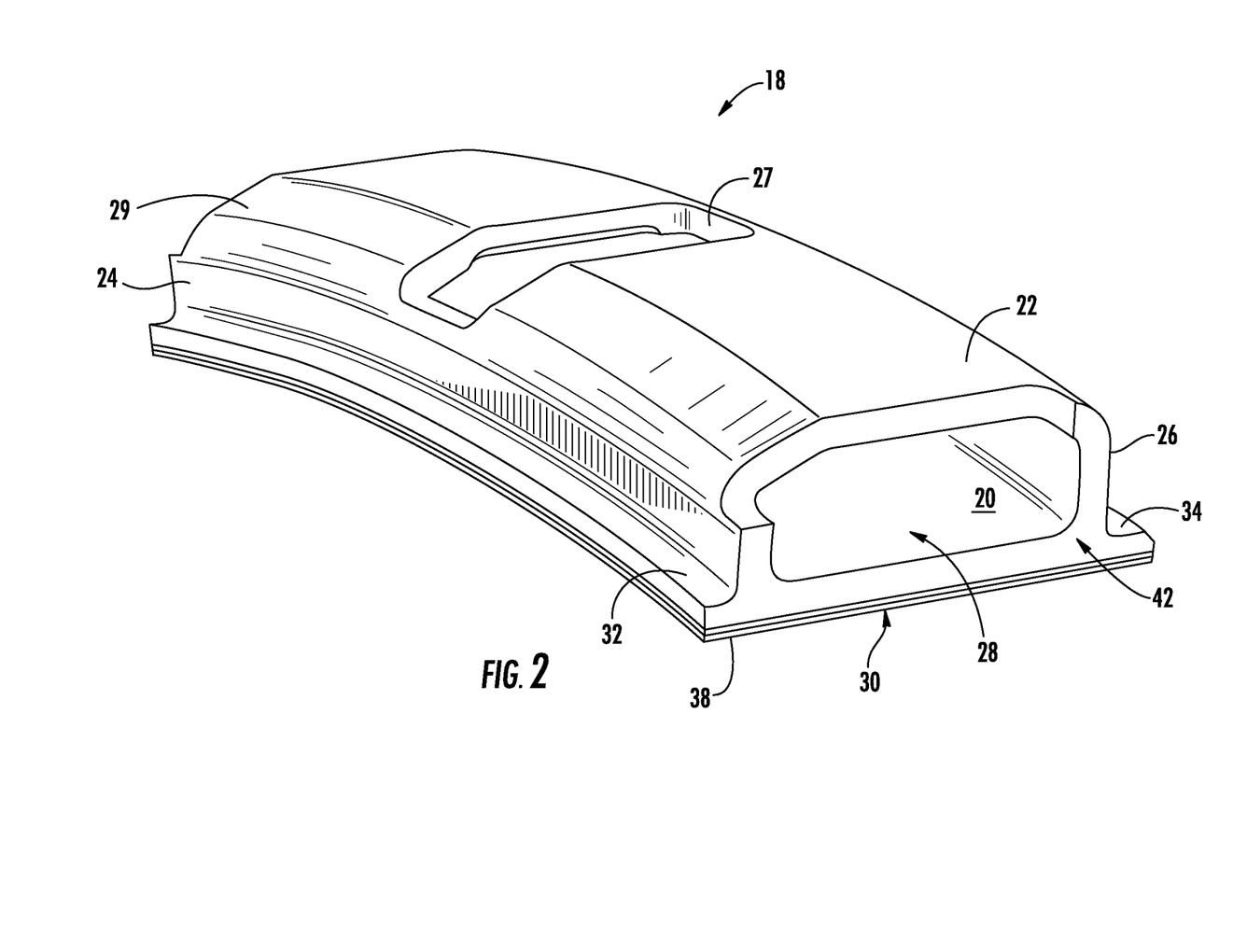
FIG. 2 is a schematic perspective view of a shroud segment seen in FIG. 1.

As seen in FIG. 2, each shroud segment 18 has a generally hollow cross-sectional shape defined by opposed inner and outer walls 20 and 22, and forward and aft walls 24 and 26. Radiused, sharp, or square-edged transitions may be used at the intersections of the walls. A shroud cavity 28 is defined within the walls 20, 22, 24, and 26. A transition wall 29 extends at an angle between the forward wall 24 and the outer wall 22, and lies at an acute angle to a central longitudinal axis of the engine when viewed in cross-section. An axially-elongated mounting slot 27 passes through the outer wall 22, the transition wall 29, and the forward wall 24. The inner wall 20 defines an arcuate radially inner flowpath surface 30. The inner wall 20 extends axially forward past the forward wall 24 to define a forward flange or overhang 32 and it also extends axially aft past the aft wall 26 to define an aft flange or overhang 34. The flowpath surface 30 follows a circular arc in elevation view (e.g. forward looking aft or vice-versa).

The shroud segments 18 are constructed from a ceramic matrix composite (CMC) material of a known type. Generally, commercially available CMC materials include a ceramic type fiber for example SiC, forms of which are coated with a compliant material such as Boron Nitride (BN). The fibers are carried in a ceramic type matrix, one form of which is Silicon Carbide (SiC). Typically, CMC type materials have a room temperature tensile ductility of no greater than about 1%, herein used to define and mean a low tensile ductility material. Generally CMC type materials have a room temperature tensile ductility in the range of about 0.4 to about 0.7%. This is compared with metals having a room temperature tensile ductility of at least about 5%, for example in the range of about 5 to about 15%. The shroud segments 18 could also be constructed from other low-ductility, high-temperature-capable materials.

The flowpath surface 30 of the shroud segment 18 may incorporate a layer of environmental barrier coating ("EBC"), which may be an abradable material, and/or a rub-tolerant material of a known type suitable for use with CMC materials. This layer is sometimes referred to as a "rub coat", designated at 38. As used herein, the term "abradable" implies that the rub coat 38 is capable of being abraded, ground, or eroded away during contact with the tips of the turbine blades 16 as they turn inside the shroud segments 18 at high speed, with little or no resulting damage to the turbine blade tips. This abradable property may be a result of the material composition of the rub coat 38, by its physical configuration, or by some combination thereof. The rub coat 38 may comprise a ceramic layer, such as yttria stabilized zirconia or barium strontium aluminosilicate. Exemplary compositions and methods suitable for making the rub coat 38 are described in U.S. Pat. No. 7,749,565 (Johnson et al.), which is incorporated herein by reference.

Figure 3:
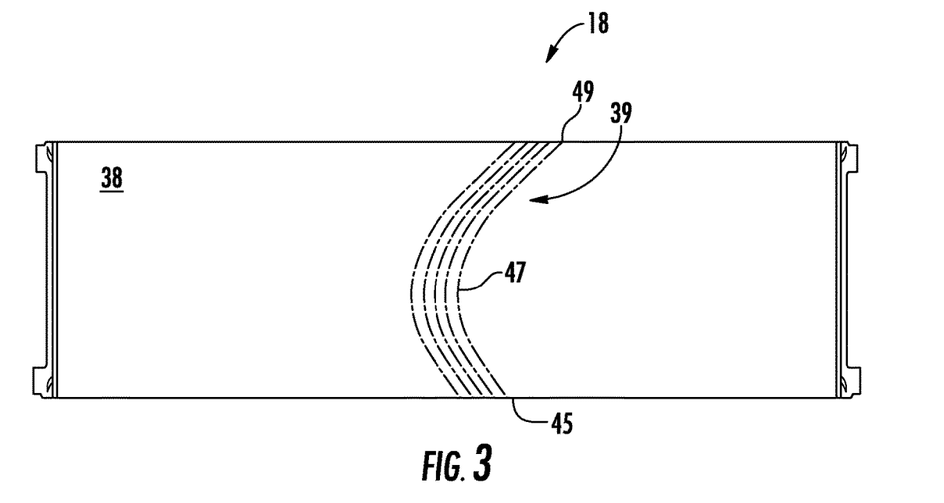
FIG. 3 is a bottom view of the shroud segment of FIG. 2.
Figure 4:
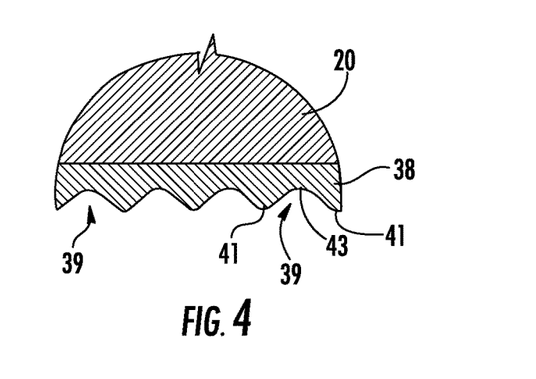
FIG. 4 is an enlarged view of a portion of FIG. 3.

FIGS. 3 and 4 depict the rub coat 38 in more detail. In the illustrated example, the rub coat 38 is patterned. The pattern enhances abradability of the rub coat by decreasing the surface area exposed to contact with the tips of the turbine blades 16. Specifically, the rub coat 38 has a plurality of side-by-side grooves 39 formed therein. The presence of the grooves 39 gives the surface a shape comprising alternate peaks 41 and valleys 43. The grooves 39 run generally in a fore-to-aft direction, and each groove 39 has a forward end 45, a central portion 47, and an aft end 49, In plan view, the grooves 39 may be curved. For example, as shown in FIG. 3, each groove 39 is curved such that its central portion 47 is offset in a lateral or tangential direction relative to its forward and aft ends 45 and 49.

The shroud segments 18 include opposed end faces 42 (also commonly referred to as "slash" faces). The end faces 42 may lie in a plane parallel to the centerline axis of the engine, referred to as a "radial plane", or they may be slightly offset from the radial plane, or they may be oriented so that they are at an acute angle to such a radial plane. When assembled into a complete ring, end gaps are present between the end faces 42 of adjacent shroud segments 18. One or more seals (not shown) may be provided at the end faces 42. Similar seals are generally known as "spline seals" and take the form of thin strips of metal or other suitable material which are inserted in slots in the end faces 42. The spline seals span the gaps between shroud segments 18.

The shroud segments 18 are mounted to a stationary metallic engine structure, shown in FIG. 1. In this example the stationary structure is part of a turbine case 44. The ring of shroud segments 18 is mounted to an array of arcuate shroud hangers 46 by way of an array of retainers 48 and bolts 50.

Figure 5:
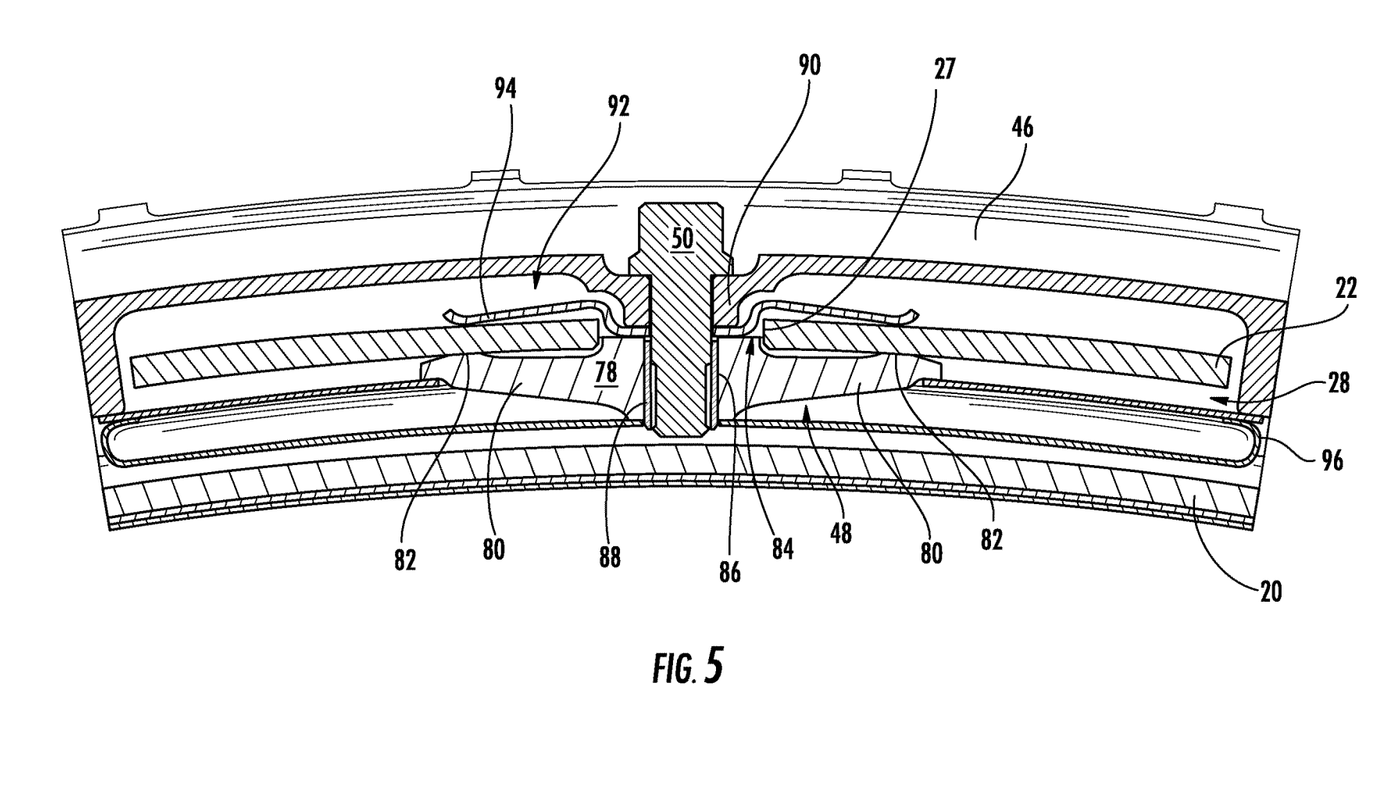
FIG. 5 is a sectional front elevation view of a portion of the turbine section shown in FIG. 1.

As best seen in FIGS. 1 and 5, each hanger 46 includes an annular body 52 which extends in a generally axial direction. The body 52 is angled such that its forward end is radially inboard of its aft end. It is penetrated at intervals by radially-aligned bolt holes 54. An annular forward outer leg 56 is disposed at the forward end of the body 52. It extends in a generally radial direction outboard of the body 52, and includes a forward hook 58 which extends axially aft. An annular aft outer leg 60 is disposed at the aft end of the body 52. It extends in a generally radial direction outboard of the body 52, and includes an aft hook 62 which extends axially aft. An annular forward inner leg 64 is disposed at the forward end of the body 52. It extends in a generally radial direction inboard of the body 52, and includes an aft-facing, annular forward bearing surface 66. An annular aft inner leg 68 is disposed at the aft end of the body 52. It extends in a generally radial direction inboard of the body 52, and includes a forward-facing, annular aft bearing surface 70. As will be explained in more detail below, the aft inner leg 68 is configured to function as a spring element. The body 52 has one or more coolant feed passages 71 formed therein which serve to receive coolant from a source within the engine (such as compressor bleed air) and route the coolant to the inboard side of the body 52.

The hangers 46 are installed into the turbine case 44 as follows. The forward hook 58 is received by an axially-forward facing forward rail 72 of the case 44. The aft hook 62 is received by an axially-forward facing aft rail 74 of the case 44. An anti-rotation pin 76 or other similar anti-rotation feature is received in the forward rail 72 and extends into a mating slot (not shown) in the forward hook 58.

The construction of the retainers 48 is shown in more detail in FIG. 5. Each retainer 48 has a central portion 78 with two laterally-extending arms 80. The distal end of each arm 80 includes a concave-curved contact pad 82 which protrudes radially outward relative to the remainder of the arm 80. The central portion 78 is raised above the arms 80 in the radial direction and defines a clamping surface 84. A radially-aligned bore 86 extends through the central portion 78. A generally tubular insert 88 is swaged or otherwise secured to the bore 86 and includes a threaded fastener hole. Optionally, the bore 86 could be threaded and the insert 88 eliminated.

The retainer 48 is positioned in the shroud cavity 28 with the central portion 78 and the clamping surface 84 exposed through the mounting hole 27 in the outer wall 22. The retainer 48 is clamped against a boss 90 of the hanger 46 by the bolt 50 or other suitable fastener, and a spring 92 is clamped between the boss 90 and the clamping surface. Each spring 92 includes a center section with a mounting hole, and opposed laterally-extending arms 94.

The relative dimensions of the boss 90, the retainer 48, and the shroud segment 18 are selected such that the retainers 48 limit the inboard movement of the shroud segments 18, but do not clamp the shroud segments 18 against the hanger 46 in the radial direction. In other words, the retainers 48 permit a definite clearance for movement in the radially outboard direction. In operation, the prevailing gas pressure load in the secondary flowpath urges the shroud segment 18 radially inboard against the retainer 48, while the retainer 48 deflects a small amount.

The springs 92 function to hold the shroud segments 18 radially inboard against the retainers 48 during assembly and for an initial grinding process to circularize the ring of shroud segments 18. However, the springs 92 are sized such that they do not exert a substantial clamping load on the shroud segments 18.

In the axial direction, the aft inner leg 68 of the hanger 46 acts as a large cantilevered spring to counteract air pressure loads in operation. This spring action urges the forward wall 24 of the shroud segment 18 against the forward bearing surface 66 of the forward inner leg 64, resulting in a positive seal between the metallic hanger 46 and the CMC shroud segments, thereby decreasing cooling flow leakage.

In the installed condition, the forward and aft overhangs 32 and 34 are disposed in axially close proximity or in axially overlapping relationship with the components forward and aft of the shroud segment 18. In the illustrated example, there is an overlapping configuration between the aft overhang 34 and the aft nozzle band 21, while the forward overhang 32 lies in close proximity to the forward outer band 14. This configuration minimizes leakage between the components and discourages hot gas ingestion from the primary flowpath to the secondary flowpath.

As noted above, the mounting slot 27 passes through the outer wall 22, the transition wall 29, and the forward wall 24. The shroud segments 18 thus incorporate a substantial amount of open area. There is not an air seal present between the perimeter of the mounting slot 27 and the hanger 46, and the shroud segments 18 do not, in and of themselves, function as plenums. Rather, the shroud segments 18 form a plenum in cooperation with the hangers 46, indicated generally at "P" in FIG. 1. Specifically, an annular sealing contact is present between the forward bearing surface 66 and the forward wall 24 of the shroud segment 18. Also, an annular sealing contact is present between the aft bearing surface 70 and the aft wall 26 of the shroud segment 18. The sealing contact is ensured by the spring action of the aft inner leg 68 as described above. The shroud segments 18 may be considered to be the "inner portion" of the plenum and the hangers 46 may be considered to be the "outer portion" thereof.

A hollow metallic impingement baffle 96 is disposed inside each shroud segment 18. The impingement baffle 96 fits closely to the retainer 48. The inboard wall of the impingement baffle has a number of impingement holes 98 formed therein, which direct coolant at the segment 18. The interior of the impingement baffle 96 communicates with the coolant feed passage 71 through a transfer passage 73 formed in the retainer 48.

In operation, air flows through passage 71, transfer passage 73, baffle 96, impingement holes 98, and pressurizes the plenum P. Spent cooling air from the plenum P exits through purge holes 100 formed in the forward wall 24 of the shroud segment 18.

The shroud mounting apparatus described above is effective to mount a low-ductility shroud in a turbine engine without applying clamping loads directly thereto, and has several advantages compared to the prior art.

In particular, the tapered edge (or wedge) shape on the forward side of the shroud allows the shroud mounting system to carry loads from forward of the shroud segments 18 to the turbine case 44 without transmitting directly through the shroud segments 18. By redirecting the load around the shroud segments 18, the stress in the shroud segments 18 remains relatively low.

Furthermore, the overhangs 32 and 34 allow the shroud segments 18 to protect the supporting structure close to the flowpath while discouraging hot gas ingestion through the use of overlaps between the shroud segments 18 and the axially adjacent nozzles. This overlapping configuration requires less cooling flow to purge the shroud-to-nozzle cavities, thereby improving overall engine performance. As the shroud material has better high temperature capability and lower stress than the adjacent nozzles, the use of the overhangs 32 and 34 provides an overall turbine life improvement.

The foregoing has described a turbine shroud mounting apparatus for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A shroud apparatus for a gas turbine engine, comprising:
    an annular metallic hanger;
    a shroud segment disposed inboard of the hanger, comprising low-ductility material and having a cross-sectional shape defined by opposed forward and aft walls, and opposed inner and outer walls, the outer wall having a mounting hole, the walls extending between opposed first and second end faces, wherein the inner wall defines an arcuate inner flowpath surface; and
    a retainer mechanically coupled to the hanger which engages the shroud segment to retain the shroud segment to the hanger while permitting movement of the shroud segment in a radial direction, wherein the retainer includes a central portion with a pair of opposed arms extending laterally outward therefrom wherein the central portion is raised above the arms in the radial direction defining a clamping surface, the clamping surface exposed through the mounting hole, and a radially-aligned bore extending through the central portion, the radially-aligned bore configured to accept a fastener.

2. The apparatus of claim 1 wherein the distal end of each arm includes a concave-curved contact pad.

3. The apparatus of claim 1 wherein a surface of the retainer is clamped against the hanger, and the outer wall of the shroud segment is trapped between the hanger and a portion of the retainer.

4. The apparatus of claim 3 wherein a spring is clamped between the hanger and the retainer and resiliently bears against the shroud segment so as to urge it radially inboard against the retainer.

5. The apparatus of claim 1 wherein the inner wall extends axially forward past the forward wall to define a forward overhang and the inner wall extends axially aft past the aft wall to define an aft overhang.

6. The apparatus of claim 1 wherein the hanger is surrounded and carried by an annular turbine case.

7. The apparatus of claim 6 wherein the hanger includes axially-spaced-apart forward and aft hooks which are received by forward and aft rails of the turbine case, respectively.

8. The apparatus of claim 1 further comprising a hollow impingement baffle disposed inside the shroud segment.

9. The apparatus of claim 8 wherein a coolant feed passage extends through the hanger and connects to the interior of the impingement baffle.

10. The apparatus of claim 1 wherein the shroud segment comprises a ceramic matrix composite material.

11. The apparatus of claim 1 wherein an annular ring of shroud segments are arranged in an annular array within the casing.

12. The apparatus of claim 1 further including a transition wall disposed between the forward and outer walls and extending at acute angles to both the forward and outer walls.

13. A shroud apparatus for a gas turbine engine, comprising:
- an annular metallic hanger including an arcuate body and axially-spaced-apart forward and aft inner legs extending radially inward from the body, the forward inner leg including an arcuate forward bearing surface and the aft inner leg including an arcuate aft bearing surface, the forward inner lea having a coolant feed passage for flowing air through;
- a shroud segment disposed inboard of the hanger, comprising low-ductility material, having a transfer passage for flowing air through, and having a cross-sectional shape defined by opposed forward and aft walls, and opposed inner and outer walls, the walls extending between opposed first and second end faces, wherein the inner wall defines an arcuate inner flowpath surface; and a hollow impingement baffle disposed inside the shroud segment, the baffle having impingement holes for flowing air through;
- wherein the shroud segment is mounted relative to the hanger such that the forward bearing surface bears against the forward wall and the aft bearing surface bears against the aft wall, such that the shroud segment and the hanger cooperatively define a plenum therebetween; and wherein during operation of the gas turbine engine, air flows through the coolant feed passage, then the air flows through the transfer passage, and then the air flows through the impingement holes, and after flowing through the impingement holes, the air pressurizes the plenum.

14. The shroud apparatus of claim 13 further comprising a retainer mechanically coupled to the hanger which engages the shroud segment to retain the shroud segment to the hanger while permitting movement of the shroud segment in a radial direction.

15. The shroud apparatus of claim 13 wherein the aft inner leg resiliently loads the shroud segment axially forward against the forward bearing surface of the hanger.

* * * * *